Dec. 4, 1934.  E. A. STALKER  1,983,493

GROUND PROPULSION OF AIRCRAFT

Original Filed Oct. 7, 1931

INVENTOR
Edward A. Stalker

Patented Dec. 4, 1934

1,983,493

UNITED STATES PATENT OFFICE 1,983,493

GROUND PROPULSION OF AIRCRAFT

Edward A. Stalker, Ann Arbor, Mich.

Original application October 7, 1931, Serial No. 567,393. Divided and this application June 30, 1934, Serial No. 733,270

2 Claims. (Cl. 244—2)

My invention relates to the ground propulsion of aircraft, the present case presenting the ground propulsive feature of my prior application Serial No. 567,393, filed October 7, 1931 in which division was required; and the objects of my invention are first to provide a means of motion over the ground by wheel traction with the ground; second to provide means of disengaging the wheel from the aircraft engine when the aircraft leaves the ground; third to provide steerable means for the tail wheel.

I attain the above objects by the mechanism illustrated in the accompanying drawing, in which—

Similar numerals refer to similar parts throughout the several views.

Figure 1:
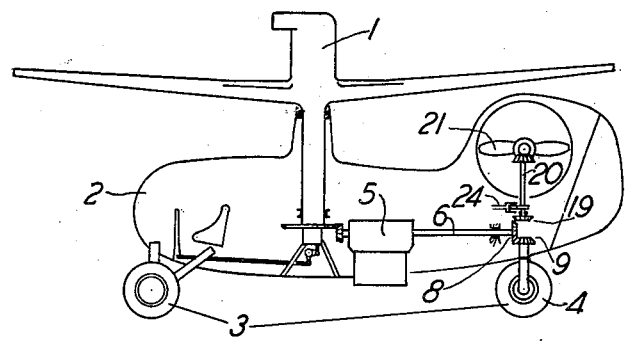
Figure 1 is a diagrammatic elevation of the aircraft.

In Figure 1 the supporting airscrew is 1, the fuselage is 2 and the landing gear is 3. The tail wheel is 4.

Figures 2, 3, 4:
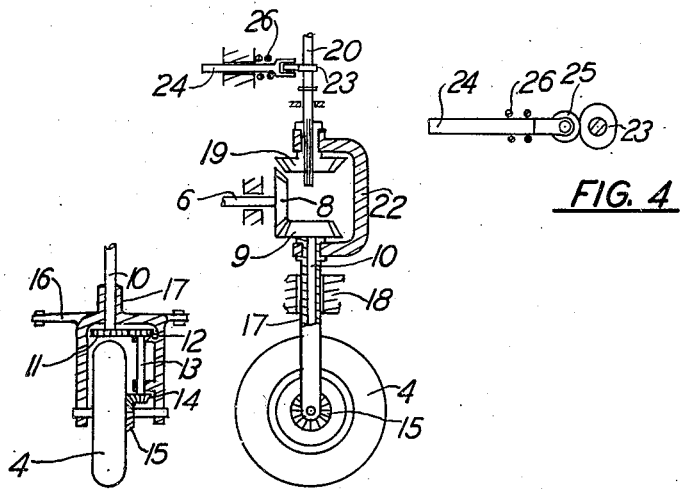
Figure 2 is an enlarged sectional view of the tail wheel and the driving mechanism.
Figure 3 is a rear view partly in section of the tail wheel and part of the driving mechanism.
Figure 4 is a detail of the propeller stopping mechanism.

The engine 5 turns the shaft 6 which carries the gear 8. On the ground the gear 8 meshes with the gear 9 carried on the vertical shaft 10. See Figures 2 and 3. The shaft 10 drives the wheel through the gears 11, 12, shaft 13 and gears 14, 15, as shown in Figure 3.

It will also be clear that the arms 16 may be connected by the conventional cables or mechanisms to the foot control for the pilot. The housing 17 of the shaft 10 is free to turn in a suitable bearing 18 supported by the fuselage structure.

When the aircraft rises off the ground the weight of the wheel 4 causes the housing 17 to slide downward relative to the bearing 18 carrying therewith the gear 9 so that it disengages from gear 8. In the same instance the gear 19 is brought into engagement with the gear 8.

The gear 19 and shaft 20 serve to drive the propeller 21 whose function is to provide a torque counter to the torque turning the main airscrew 1. Suitable gears connect the shaft 20 to the propeller 21 as shown in Figure 1.

The gear 19 is rotatably supported in the housing 22 and is splined to the shaft 20 to permit a vertical movement of the gear 19 independently of the shaft 20.

In order to stop the rotation of shaft 20 when the gear 8 is not engaged to it there is provided the cam 23 (see Figures 2 and 4) and the push rod 24 carrying the roller 25. The pressure of the roller 25 against the cam 23 provided by the spring 26 will bring the shaft 20 to a stop without appreciable shock; and the pilot may disengage the roller by pulling on the shaft 24 by a suitable mechanism such as is used frequently in aircraft and familiar to everyone skilled in mechanics.

I need not describe the mechanism by which the engine drives the airscrew 1 since no features of this drive itself form a part of this invention. It is sufficient to say that as shown in Figure 1 a suitable shaft and gears are readily provided for the purpose.

While the form of apparatus herein described constitutes a preferred embodiment it is to be understood that the invention is not limited to these precise forms of apparatus, and that changes may be made therein without departing from the scope of the invention which is defined in the appended claims.

I claim:

1. In a combination in an aircraft an engine, a landing gear wheel, means of driving the wheel and means of disengaging automatically the driving means when the aircraft rises.

2. In combination in an aircraft supported by an airscrew, an engine, a counter torque propeller, a means of driving the propeller, and means of disengaging automatically the driving means when the aircraft makes contact with the ground.

EDWARD A. STALKER.